United States Patent [19]

Obremski

[11] 4,236,185
[45] Nov. 25, 1980

[54] METHOD FOR DISTORTION-FREE STILL PICTURE REPRODUCTION WITH MAGNETIC VIDEO TAPE

[75] Inventor: Michael Obremski, Fuerth, Fed. Rep. of Germany

[73] Assignee: Grundig E. M. V. Elektro-Mechanische Verswchsanstalt Max Grundig, Fuerth, Fed. Rep. of Germany

[21] Appl. No.: 946,335

[22] Filed: Sep. 27, 1978

[30] Foreign Application Priority Data

Nov. 16, 1977 [DE] Fed. Rep. of Germany ....... 2751180

[51] Int. Cl.³ .......................... H04N 5/78; G11B 5/56
[52] U.S. Cl. ............................ 360/10; 360/77; 360/107; 360/109
[58] Field of Search ............... 360/10, 11, 70, 75, 360/77, 109, 107; 358/4

[56] References Cited

U.S. PATENT DOCUMENTS

| 3,359,365 | 12/1967 | Kihara | 360/11 X |
| 3,821,787 | 6/1974 | Kihara | 358/4 |
| 3,995,317 | 11/1976 | Schmidt | 360/109 |
| 4,141,047 | 2/1979 | Kambara et al. | 360/109 |

OTHER PUBLICATIONS

Price, G. E., "Video Tape Recorder with Oscillating Head", IBM Technical Disclosure Bulletin, vol. 12, No. 1, Jun., 1969, pp. 33-34.

*Primary Examiner*—Bernard Konick
*Assistant Examiner*—Donald McElheny, Jr.

[57] ABSTRACT

A method for distortion-free still picture reproduction from magnetic video tape slant tracks wherein the tracks are recorded and scanned without any guard band therebetween by means of two video heads which rotate in a common plane with different azimuth angles. During still picture recording, two adjacent slant tracks are continuously or repetitively scanned by two rotating video hands which have different azimuth angles with one head displaced axially by one slant track width with respect to the other. During still mode reproduction, the two adjacent slant tracks are continuously scanned by mechanically deflecting the two rotating video heads by way of plungers following a ring.

1 Claim, 5 Drawing Figures

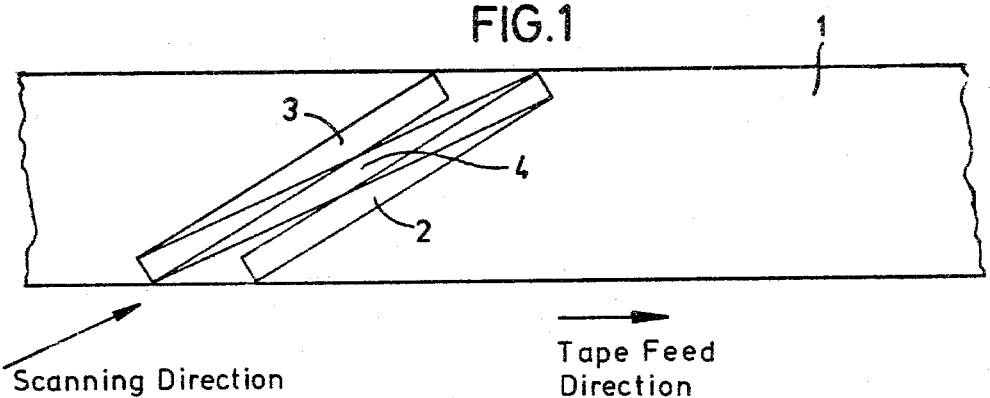
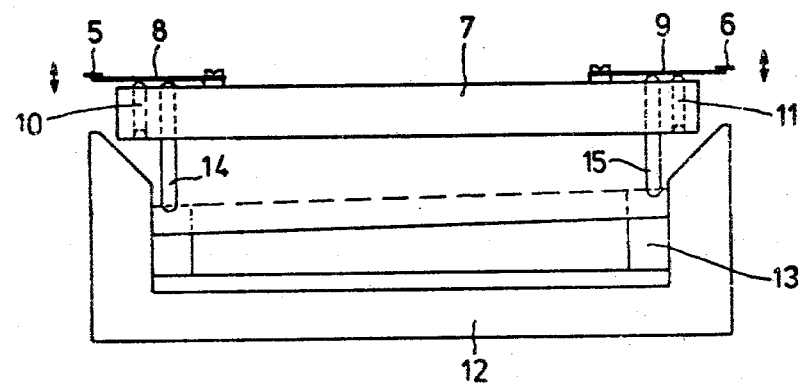
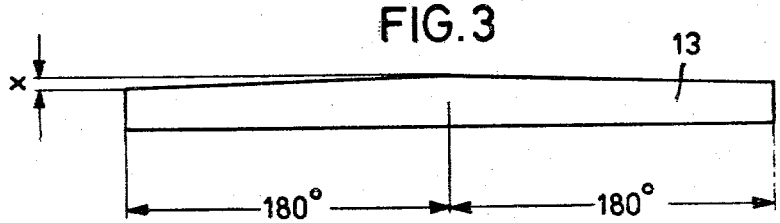

METHOD FOR DISTORTION-FREE STILL PICTURE REPRODUCTION WITH MAGNETIC VIDEO TAPE

BACKGROUND OF THE INVENTION

The present invention relates to video recording and in particular to reproducing still pictures recorded along slant tracks on magnetic video tape.

When reproducing still pictures recorded on slant tracks on magnetic tape it is common practice to repeatedly scan the same slant track with the rotating head or heads. This is particularly true for the widely used devices wherein a field is recorded per slant track with two 180° offset video heads. The two video heads scan the same slant track in sequence and repeatedly. However, the signal-to-noise ratio with such devices is reduced when the magnetic tape is idle as compared to when the tape is moving since the scanning device of the video heads is not in conformity with the recorded tracks. This is illustrated in FIG. 1 wherein tracks 2 and 3 depict the tracks recorded (or scanned) by a video head when the tape is in motion and track 4 depicts a track recorded (or scanned) when the tape is stopped.

Heretofore, several proposals to eliminate the error resulting from the above have been proposed. For example, the angle of inclination of the total slant track cylinder may be changed so that the video heads follow the recorded tracks 2 and 3, even when the tape is idle. This is suggested in U.S. Pat. No. 3,375,331. French Pat. No. 2,107,066 suggests the vertical adjustment of the tape feed at the slant track cylinder. IBM Technical Disclosure Bulletin, June 1969, pages 33/34 suggests reciprocal movement of the video heads axially during each rotation of the head. Unfortunately, none of the above can be employed if for tape saving purposes, the slant tracks are recorded immediately adjacent to each other without any guard band and if they are recorded with different azimuth angles in order to eliminate cross talk. For example, a known device uses two video heads for recording and reproducing, wherein the azimuth angle of the gap of the one video head is 15° in clockwise direction and the azimuth angle of the gap of the other video head is 15° in counterclockwise direction. With this embodiment it is impossible to obtain a distortion-free still picture recording by means of repeated scanning of the same track, even if one of the above mentioned means for compensating for the differing angle between the scanning direction of the heads and the inclination of the recorded track is used.

In view of the above, it is an object of the present invention to provide a method to permit distortion-free still picture reproduction with such slant track devices, wherein adjacent slant tracks are recorded and scanned without a guard band therebetween and with different azimuth angles.

SUMMARY OF THE INVENTION

The above and other beneficial objects are attained in accordance with the present invention by providing a method for the distortion-free reproduction of slant track magnetic video tape wherein adjacent tracks, each containing a field, are recorded and scanned without any guard band therebetween by means of two video heads which rotate in a common plane with different azimuth angles. One of the video heads is displaced axially with respect to the other head by a distance equal to one slant track width of the magnetic tape.

BRIEF DESCRIPTION OF THE DRAWINGS

In the accompanying drawings:

FIG. 1 is a plan view of a length of magnetic tape having slant tracks immediately adjacent to one another recorded thereon;

FIG. 2 is a simplified schematic drawing of a mounting arrangement for video heads in accordance with the present invention;

FIG. 3 is a wind up of the ring of FIG. 2; that is, FIG. 3 sets forth the height of ring 13 as a function of angular displacement proceeding for a full 360° about the ring;

DETAILED DESCRIPTION OF THE PREFERRED EMBODIMENT

Figure 4:
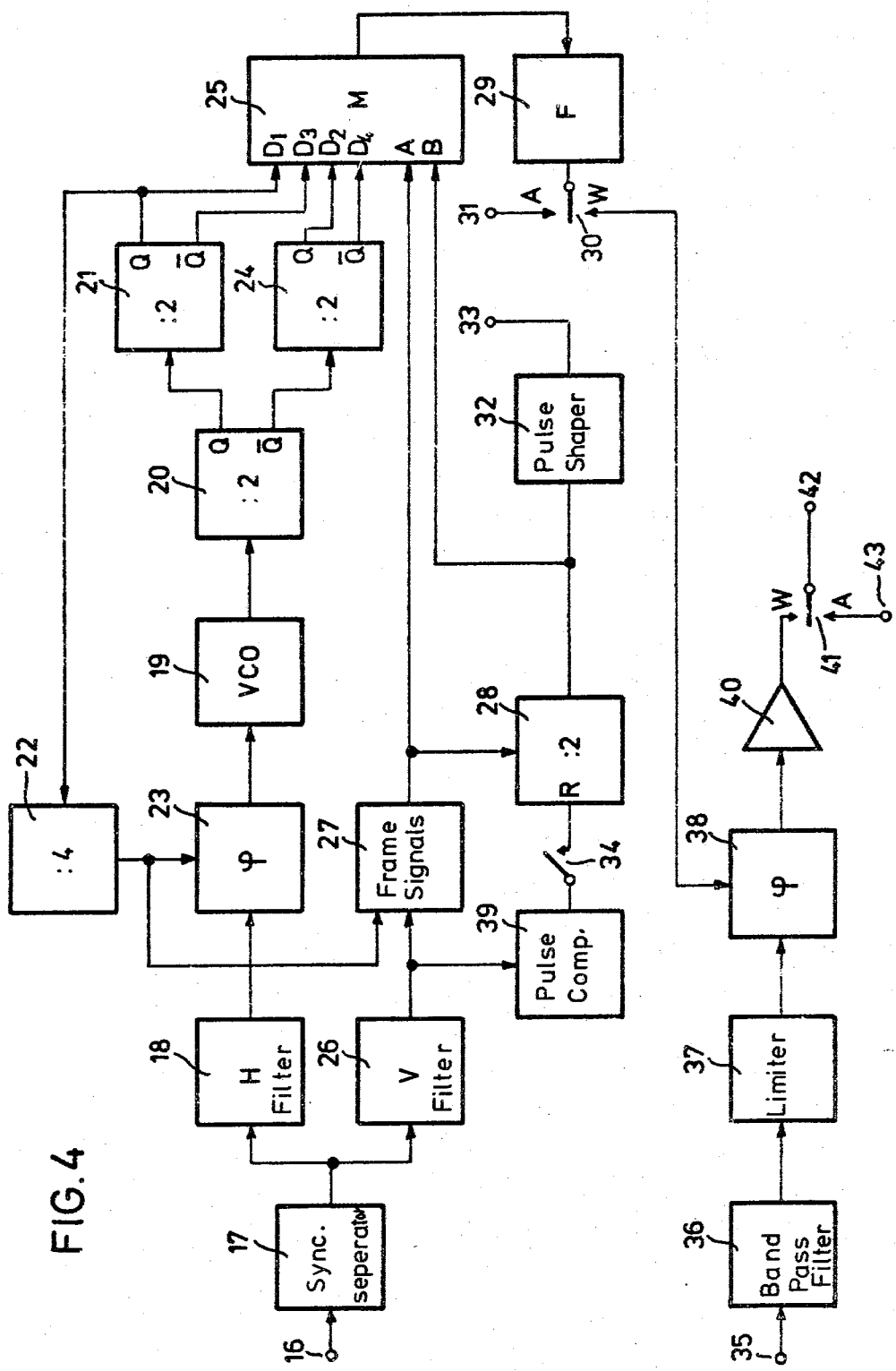
FIG. 4 is a block diagram of a circuit for carrying out the present invention electronically; and, FIG. 5 is a waveform diagram of various outputs of the circuit of FIG. 4.

In accordance with the present invention, an arrangement is provided to compensate for the different angles of the slant track when the tape is idle or moving. Reference is made to FIG. 2 wherein a first embodiment of the invention is depicted schematically. Two video heads 5 and 6 which differ in their azimuth angles are mounted on the head wheel 7 on spring plates 8 and 9. The video heads 5 and 6 are adjusted by screws 10 and 11 to their desired position, that is, so that they lie in a common rotational plane for the normal operation. A ring 13 is provided in the lower stationary slant track cylinder 12. Ring 13 can be shifted from the solid line position of FIG. 2 to the position of FIG. 2 as shown in the dotted lines, when the device is switched from normal picture reproduction to still picture reproduction. The ring 13 is divided, as shown in FIG. 3, so that its upper edge rises linearly through half its circumference. The amount of change, which is denoted by the letter "X" is equal to the width of a slant track on the magnetic tape. Plungers 14 and 15 engage the upper edges of ring 13. The distance "X" corresponds to an axial displacement of one track width taking into consideration the lever transmission on springs 8 and 9. Plunger 15 is shorter by the distance X than plunger 14. As a result, the video head 5 is displaced with respect to video head 6 by a complete track width when the ring 13 is displaced into the position indicated by the dotted lines. When rotating the head wheel 7 both video heads move axially in accordance with the upper edge of ring 13 and thereby follow the recorded tracks 2 and 3 of FIG. 1.

A circuit for carrying out the inventive method with purely electronic means is shown in FIG. 4. In this embodiment the axial adjustment of the one video head by one track width and the subsequent axial guiding of both video heads in accordance with the recorded tracks is carried out in a commonly known manner wherein the video heads are mounted on electromechanical transducers, for example, piezoceramic elements. The control voltages for the piezoceramic must be obtained from the scanned video signals. Accordingly, the tracks must be provided with suitable signals which, on the one hand should not interfere with the chrominance signals, and on the other hand must be readable for a video head with the "wrong" azimuth angle. For these reasons only very low frequencies are used for the signal frequencies. The frequencies should be beneath the chrominance subcarrier.

Figure 5:
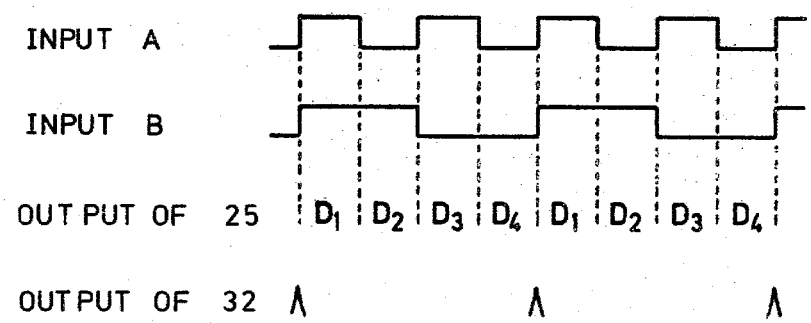

In accordance with this embodiment of the invention, synchronizing pulses of the video signal are applied to the terminal 16 (see FIG. 4) and are separated in separator 17 and fed to a filter 18 which supplies constant line pulses. A voltage controlled oscillator 19 oscillates at a median frequency of, for example, 16 times line frequency, and synchronizes the line pulse received from filter 18 across the dividers 20, 21 and 22 through phase comparator 23. A further divider 24 is coupled to the inverting output of 20. The inverted and noninverted outputs of 21 and 24 are fed to a multiplexer 25 which multiplexes the outputs by approximately 90° with respect to each other in the sequence of $D_1$, $D_2$, $D_3$ and $D_4$ as shown in FIG. 5.

Vertical blanking pulses received from separator 17 are filtered in the filter device 26 (which separates the vertical signal) and are converted to regular frame signals in 27. The frame signals are fed to the multiplexer 25 (input A) and are also fed to divider 28, the output of which is also fed to the multiplexer (input B).

Multiplexer 25 operates as a quadruple converter and switches the D-voltages in series in accordance with logical orders from its A and B inputs. This is shown schematically in FIG. 5. The output voltage of multiplexer 25 is filtered in filter 29 and fed to the center top of switch 30. This voltage may then be fed to a terminal 31 through switch 30 and from there the output voltage is added to the frequency modulated video signal before recordation. Since each halfwave of voltage A corresponds to a field and thereby to a slant track, a voltage of quadruple line frequency is superimposed to the frequency modulated video signal and the phase of the superimposed signal changes from slant track to slant track by about 90°. Simultaneously, the divided frame pulses in 28 are fed to a pulse shaper 32 wherein they are converted as shown in FIG. 5 in such a manner that when they are added to the video signal across terminal 33, one or a plurality of follow up equalizing pulses in the vertical signal of the first field of every second frame is blanked out. In this manner each slant track is coded by virtue of the phase of the D-voltage which superimposes the frequency modulated video signal and the start of each second frame by gating the follow up equalizing pulses. The frequency of the code signals is lower than the frequency ranges for chrominance and brightness and is locked to the line frequency.

During the reproduction of a still picture, switch 30 is positioned with its center tap connecting with terminal W, switch 34 is closed and the scanned demodulated video signal is at terminal 16. The scanned frequency modulated video signal from which the code frequency is filtered out through band pass filter 36, is applied at terminal 35 and is fed to a phase comparator 38 through limiter 37. The vertical signals which are present at output 26 are tested in pulse comparator 39 by means of a time circuit to determine if follow up equalizing pulses are gated. If so, a reset (flip-flop) signal is fed to divider 28, so that in accordance with the sketch in FIG. 5 only phases $D_1$ and $D_2$ are discharged from the multiplexer 25 and fed to the comparator 38. The error signal of comparator 38 controls an amplifier 40, the output of which is fed to a terminal 42 across a switch 41. The electro-mechanical converters (which comprise, for example, piezoceramic elements which are not shown) are coupled to the terminal and the video heads are mounted to the piezoceramic. During recording, switch 41 is in position A and the electromechanical converters are fed with a constant bias, so that they rotate in a common plane.

Having thus described the invention, what is claimed is:

1. A device for the recording, reproduction, and distortion-free reproduction of slant tracks recorded on magnetic video tape without any intermediate spacing between adjacent tracks, said device comprising: a drum; two video heads mounted in said drum and adapted to rotate in a common plane with different azimuth angles; a pair of spring leaves, each of said heads being mounted to one of said springs; a pair of plungers, each plunger having one end engaging one of said springs and an opposite end; and an axially adjustable ring mounted in said drum, said ring having an upper surface which rises linearly for half the width of a slant track about half its circumference and declines linearly over the remaining half of its circumference, said ring being adjustable between a first position out of contact with said plungers and a second position wherein said plungers' opposite ends engage said ring upper surface; and one of said plungers is shorter than the other of said plungers by the width of a slant track.

* * * * *